(12) United States Patent
Shimizu et al.

(10) Patent No.: US 9,816,562 B2
(45) Date of Patent: Nov. 14, 2017

(54) VACUUM PUMP

(71) Applicant: Shimadzu Corporation, Kyoto (JP)

(72) Inventors: Koichi Shimizu, Kyoto (JP); Osamu Ashida, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 14/800,771

(22) Filed: Jul. 16, 2015

(65) Prior Publication Data

US 2016/0069391 A1  Mar. 10, 2016

(30) Foreign Application Priority Data

Sep. 10, 2014 (JP) .................................. 2014-184547

(51) Int. Cl.
| | | |
|---|---|---|
| *F16C 37/00* | (2006.01) | |
| *F04D 29/66* | (2006.01) | |
| *F04D 19/04* | (2006.01) | |
| *F04D 29/058* | (2006.01) | |
| *F04D 29/059* | (2006.01) | |
| *F04D 29/063* | (2006.01) | |
| *F16C 33/66* | (2006.01) | |
| *F16C 27/06* | (2006.01) | |
| *F16C 19/06* | (2006.01) | |
| *F16C 32/04* | (2006.01) | |

(52) U.S. Cl.
CPC .......... *F16C 37/007* (2013.01); *F04D 19/042* (2013.01); *F04D 29/058* (2013.01); *F04D 29/059* (2013.01); *F04D 29/063* (2013.01); *F04D 29/668* (2013.01); *F16C 27/066* (2013.01); *F16C 33/6607* (2013.01); *F16C 33/6633* (2013.01); *F16C 19/06* (2013.01); *F16C 32/0423* (2013.01); *F16C 2360/45* (2013.01)

(58) Field of Classification Search
CPC ...... F04D 19/04; F04D 19/042; F04D 29/056; F04D 29/668; F16C 27/066; F16C 33/6607; F16C 33/6614; F16C 37/007
See application file for complete search history.

(56) References Cited

U.S. PATENT DOCUMENTS

| | | | |
|---|---|---|---|
| 2006/0245960 A1* | 11/2006 | Schooling ............. | F04D 19/042 417/423.12 |
| 2013/0121858 A1* | 5/2013 | Sekita ................... | F04D 29/059 417/423.12 |
| 2015/0132109 A1 | 5/2015 | Sumimoto | |

FOREIGN PATENT DOCUMENTS

| | | | | |
|---|---|---|---|---|
| DE | 2 144 307 | | 1/1973 | |
| EP | 1 760 319 A1 | | 3/2007 | |
| EP | 2557315 A2 * | | 2/2013 | .......... F16C 33/6648 |
| JP | 10-288195 | | 10/1998 | |
| WO | WO 2004099622 A1 * | | 11/2004 | ............. F04D 19/04 |
| WO | WO 2006/131694 A1 | | 12/2006 | |

OTHER PUBLICATIONS

English translation of Chinese Office Action dated May 4, 2017 for corresponding Chinese Application No. 201510461378.6.

* cited by examiner

*Primary Examiner* — Phillip A Johnson
(74) *Attorney, Agent, or Firm* — Renner, Otto, Boisselle & Sklar, LLP

(57) ABSTRACT

A vacuum pump comprises: a ball bearing which supports a rotor; a holding section which elastically holds an outer ring of the ball bearing; and a grease which is filled between the outer ring and the holding section, the grease having a consistency of NLGI No. 1.5 or less.

10 Claims, 4 Drawing Sheets

US 9,816,562 B2

VACUUM PUMP

BACKGROUND OF THE INVENTION

1. Field of the Invention

The present invention relates to a vacuum pump in which a rotor is supported by a ball bearing.

2. Description of the Related Art

Conventionally, there has been known a vacuum pump in which a rotor shaft of a rotor is supported by a ball bearing lubricated with grease. In such a vacuum pump, vibration is generated by whirling due to unbalance of the rotor, and the vibration is disadvantageously transmitted to the outside of the pump. As a countermeasure, there is a method of elastically supporting the ball bearing to damp the vibration.

For example, in a turbo-molecular pump described in WO 2006/131694, an inner sleeve which holds an outer ring of a ball bearing is held by an outer sleeve and the outer sleeve is fixed to a base. Further, in this configuration, elastic bodies (O-rings) are disposed between the outer periphery of the outer ring and the inner sleeve and between the inner sleeve and the outer sleeve. Further, a gel layer formed of thermal conductive gel is provided for improving the heat radiation performance between the inner sleeve and the outer sleeve. The gel layer is sealed with the elastic bodies.

However, when the ball bearing is elastically supported, it is necessary to sufficiently reduce the elastic modulus in order to sufficiently damp vibration transmitted to the outside of the pump. Thus, in the configuration as described in WO 2006/131694, that is, the configuration in which the gel layer is provided in a clearance in the radial direction between the inner sleeve and the outer sleeve, the support stiffness in the radial direction cannot be sufficiently reduced due to the influence of the gel layer.

SUMMARY OF THE INVENTION

A vacuum pump comprises: a ball bearing which supports a rotor; a holding section which elastically holds an outer ring of the ball bearing; and a grease which is filled between the outer ring and the holding section, the grease having a consistency of NLGI No. 1.5 or less.

Preferably the holding section includes at least two elastic members which elastically support the outer ring, and the grease is filled in a region surrounded by the at least two elastic members, the outer ring and the holding section.

Preferably the grease is maintained in a grease state at a pump operating temperature so as to be prevented from flowing out of the region surrounded by the at least two elastic members, the outer ring and the holding section.

Preferably a dimension of a clearance in the radial direction of the region filled with the cooling grease is set to be 0.1 mm to 0.3 mm.

Preferably the vacuum pump further comprises a heat radiation member including a contact section being in contact with the outer ring and a heat radiation section extending from the contact section and disposed in the region filled with the grease, the heat radiation member having a higher thermal conductivity than the outer ring.

Preferably the grease has an oil separation degree of 10% or less at a pump operating temperature.

Preferably the grease is a fluorine grease having a saturated vapor pressure of $10^{-8}$ Pa or less at a temperature of 20° C.

Preferably the thermal conductivity of the grease is 0.15 to 0.4 W/mK.

Preferably the holding section includes a first ring-like elastic member disposed on the upper end face of the outer ring, a second ring-like elastic member disposed on the lower end face of the outer ring, and a third ring-like elastic member disposed on the outer peripheral side of the outer ring, and the grease is filled in a region surrounded by the elastic members, the outer ring and the holding section.

According to the present invention, the support stiffness can be reduced while ensuring the heat radiation performance from the ball bearing.

DETAILED DESCRIPTION OF PREFERRED EMBODIMENT

Figure 1:
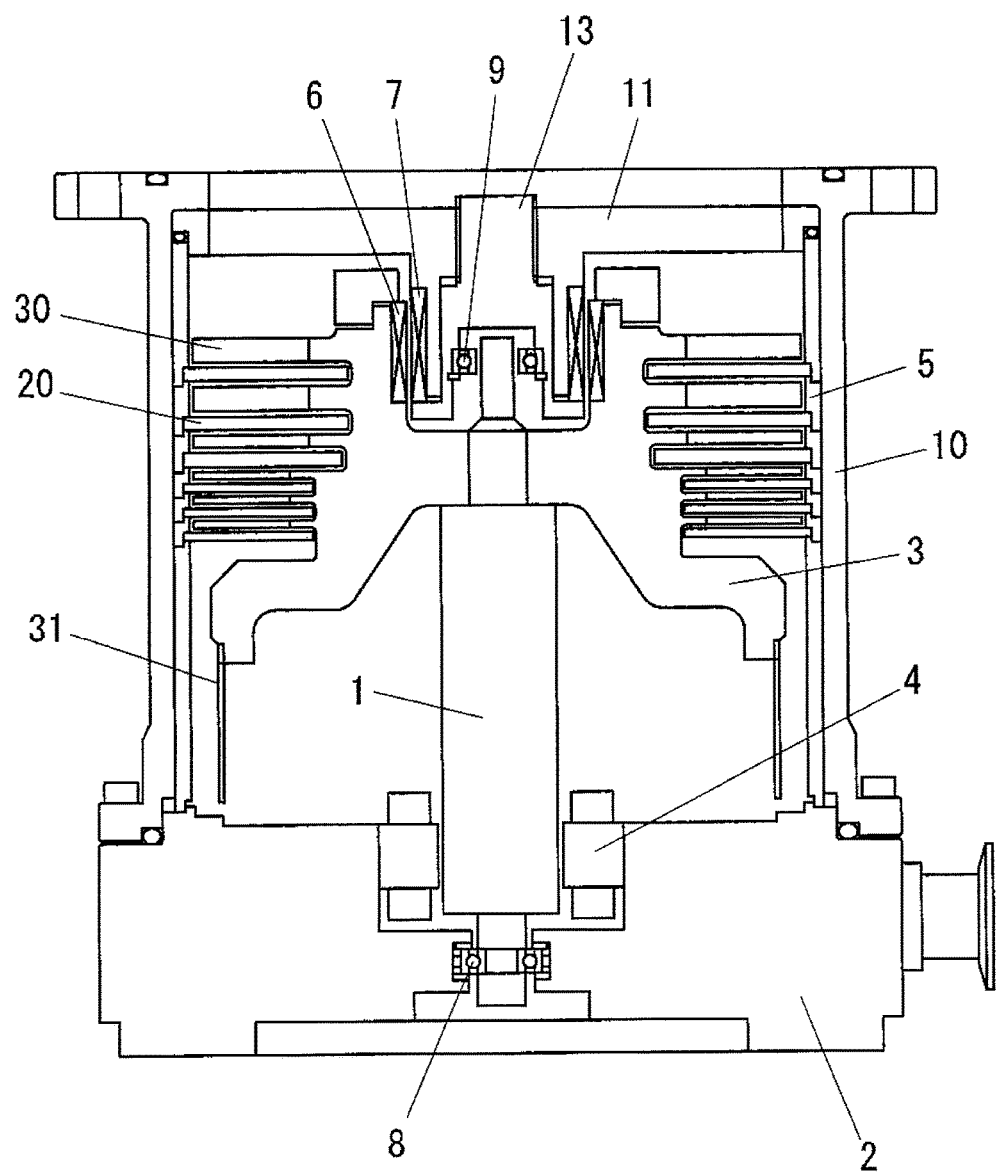
FIG. 1 is a diagram showing an embodiment of a vacuum pump according to the present invention, specifically, a sectional view of a turbo-molecular pump 100.

Hereinafter, an embodiment of the present invention will be described with reference to the drawings. FIG. 1 is a diagram showing an embodiment of a vacuum pump according to the present invention, specifically, a sectional view of a turbo-molecular pump 100. Rotor blades 30 and a cylindrical section 31 are formed as an exhaust function section on a rotor 3. Stationary blades 20 as a stationary side exhaust function section are provided corresponding to the rotor blades 30. Further, a stationary tube is provided as a stationary side exhaust function section corresponding to the cylindrical section 31. The stationary tube is not illustrated in FIG. 1.

The rotor 3 is fastened to a shaft 1. The shaft 1 is driven to rotate by a motor 4. The rotor 3 fastened to the shaft 1 is rotatably supported by a magnetic bearing which uses permanent magnets 6 and 7, and a ball bearing 8. The cylindrical permanent magnet 6 is fixed to the rotor 3. On the other hand, the permanent magnet 7 on the stationary side is held by a magnet holder 11 and arranged to face the permanent magnet 6 on the inner peripheral side of the permanent magnet 6.

The magnet holder 11 is fixed to a flange part of a pump case 10. In the example shown in FIG. 1, a beam part of the magnet holder 11 and spacer rings 5 which position the stationary blades 20 are held between the flange part of the pump case 10 and a base 2 in a sandwiched manner. A bearing holder 13 which holds a ball bearing 9 is fixed to the center of the magnet holder 11.

The ball bearing 9 is provided for restricting runout in the radial direction of the upper part of the shaft 1. A clearance is formed between an inner ring of the ball bearing 9 and the shaft 1. A dimension of the clearance is set to be smaller than a dimension of a clearance between the permanent magnets 6 and 7. This configuration prevents contact between the permanent magnets 6 and 7 when whirling of the rotor 3 increases.

In the vacuum pump of the present embodiment, the rotor 3 is supported by the magnetic bearing which uses the permanent magnets 6 and 7, and the ball bearing 8. However, the present invention may also be applied to a vacuum pump in which a ball bearing is used instead of the magnetic bearing.

Figure 2:
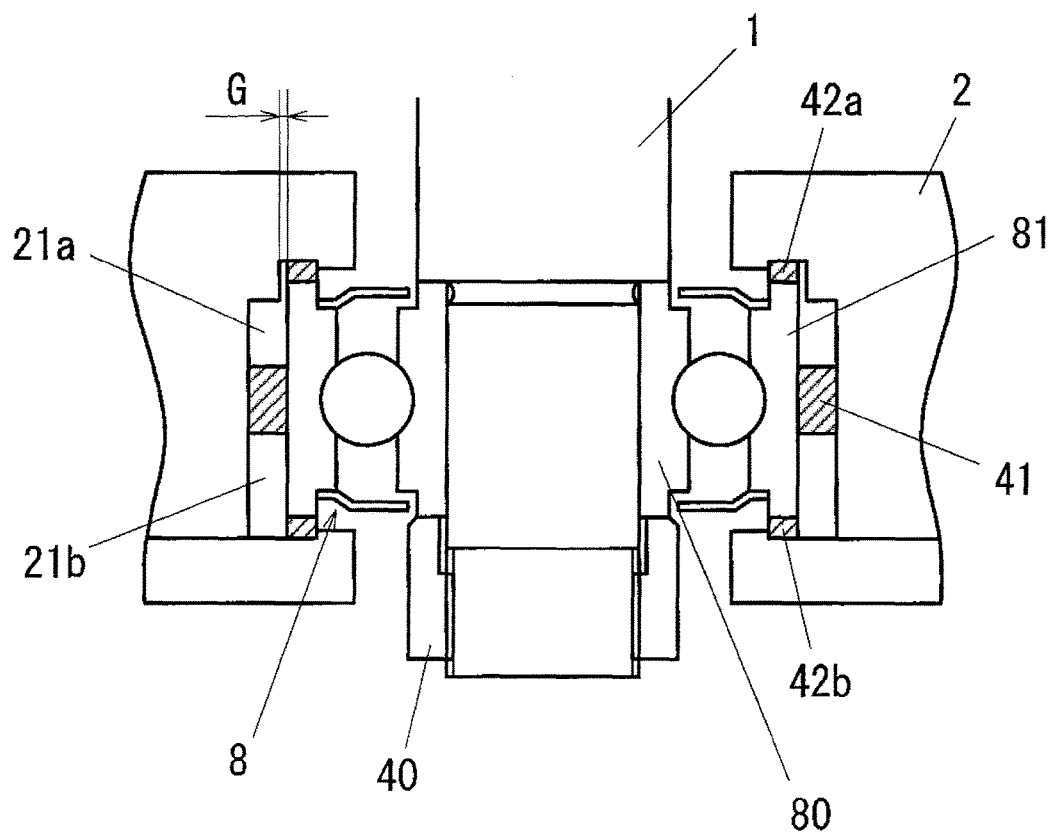
FIG. 2 is an enlarged view showing the configuration of a ball bearing 8 part in detail.

FIG. 2 is an enlarged view showing the configuration of the ball bearing 8 part in detail. An inner ring 80 of the ball bearing 8 which is disposed on the lower part of the shaft 1 is fixed to the shaft 1 with a nut 40. On the other hand, an outer ring 81 of the ball bearing 8 is elastically supported on the base 2. A ring-like elastic member 42a is disposed on the upper end face of the outer ring 81. A ring-like elastic member 42b is disposed on the lower end face of the outer ring 81. In other words, the outer ring 81 is supported by the base 2 via the elastic members 42a and 42b. Further, a ring-like elastic member 41 is disposed on the outer peripheral side of the outer ring 81.

In the example shown in FIG. 2, the cross-sectional shape of each of the elastic members 41, 42a and 42b is a rectangular shape. However, the cross-sectional shape is not limited to a rectangular shape. A dimension G of a clearance in the radial direction between the outer ring 81 and the base 2 is set to a dimension that prevents contact between the outer ring 81 and the base 2, that is, a dimension that enables the outer ring 81 to be elastically supported even when the shaft 1 whirls. For example, the dimension G is set to approximately 0.1 mm to 0.3 mm. The elastic members 42a and 42b mainly support the outer ring 81 in the axial direction and have extremely small stiffness against the radial displacement of the outer ring 81. The elastic member 41 is provided for supporting the outer ring 81 in the radial direction.

The elastic member 41 is compressed and deformed by the radial displacement of the shaft 1. Thus, for example, the radial support stiffness by the elastic member 41 can be made extremely small by setting a clearance between the elastic member 41 and the base 2 to be approximately zero or a slight clearance (<G) when the shaft 1 is located at a center position (an ideal position in which the radial displacement is zero). Setting the elastic members 41, 42a and 42b in this manner makes it possible to make the radial support stiffness caused by the elastic members 41, 42a and 42b extremely small and reduce pump vibration caused by rotor whirling in the radial direction.

Further, clearances 21a and 21b between the outer ring 81 and the base 2 are filled with a cooling grease for improving heat transfer from the outer ring 81 to the base 2. In order to reduce the influence on the radial support stiffness for the shaft 1, a grease having a relatively soft consistency is used as the cooling grease. Specifically, a grease of NLGI (National Lubricating Grease Institute) No. 00, No. 0, No. 1, or No. 1.5 is preferably used. The grease of NLGI No. 1.5 has a consistency between a consistency of NLGI No. 1 and a consistency of NLGI No. 2.

Using a soft grease having a low consistency in this manner enables the cooling grease to smoothly move inside the clearances 21a and 21b when the ball bearing 8 moves in the radial direction. Accordingly, it is possible to reduce the influence on the radial support stiffness (that is, suppress an increase in the support stiffness). When a grease having a consistency higher than a consistency of NLGI No. 1.5 is used, fluidity of the cooling grease inside the clearances 21a and 21b is lowered to cause an increase in the support stiffness. Accordingly, vibration transmitted to the base 2 increases.

In a bearing of a turbo-molecular pump which rotates at high speed, a grease having a high oil separation degree is used to achieve high lubricity and low rolling friction. Thus, when the heat radiation performance is low, evaporation or deterioration of the grease enclosed in the bearing is accelerated, which shortens its useful life. However, in the present embodiment, heat generated in the ball bearing 8 is transmitted to the base 2 not only through the elastic members 41, 42a and 42b, but also through the cooling grease filled in the clearances 21a and 21b. Thus, the occurrence of such a problem can be prevented.

The cooling grease is preferably maintained in a grease state at a pump operating temperature (typically, 20° C. to 80° C.). Specifically, the oil separation degree at an actual operating temperature is preferably 10% or less. The elastic members 42a and 42b bear a function of supporting the outer ring 81 with small support stiffness, a function of releasing heat of the ball bearing 8 to the base 2, and a function, as a seal member, of preventing the cooling grease from flowing out through the clearances 21a and 21b. Thus, using a grease maintained in a grease state at a pump operating temperature as the cooling grease enables the heat radiation performance and the support performance of the elastic members 42a and 42b to be set in preference to the sealing performance thereof.

For example, an elastomer having a rectangular cross section as shown in FIG. 2 has a characteristic of low thermal resistance. However, the elastomer having a rectangular cross section is not in intimate contact with the base 2 and the end face of the outer ring 81 as an O-ring seal provided with an appropriate squeeze, and thus inferior in sealability. However, the cooling grease having an oil separation degree of 10% or less can be held in the clearances 21a and 21b even when an elastomer having a rectangular cross section which is inferior in sealability is used. Further, when a grease having a high oil separation degree is used, it is necessary to bring an elastomer seal such as an O-ring seal into intimate contact with the outer ring 81 and the base 2 with an appropriate squeeze. Thus, it is difficult to obtain low support stiffness.

For example, when a grease having an oil separation degree of more than 10% is used as the cooling grease, a separated oil component (base oil) may flow out through the clearance between each of the elastic members 42a and 42b, and the base 2 and the end face of the outer ring and may be mixed into the grease in the ball bearing 8, which may cause deterioration of the lubricity.

The thermal conductivity of the cooling grease in the present embodiment is only required to be 0.15 to 0.4 W/mK. Thus, it is not particularly necessary to use, for example, a grease mixed with a solid matter such as metal and a metallic oxide, a thermal paste, or a thermal gel. Further, a fluorine grease having a low vapor pressure may be used. For example, a fluorine grease having a saturated vapor pressure of $10^{-8}$ Pa or less at a temperature of 20° C. is used. There is a fluorine grease having a low consistency (soft) and having a low oil separation degree at a temperature up to approximately 200° C. Such a fluorine grease is suitable for cooling grease used in a vacuum pump. As described above, a fluorine grease having a low vapor pressure is available. Such a fluorine grease makes it possible to maintain low vibration and bearing cooling effect for a long period of time.

(First Modification)

Figure 3:
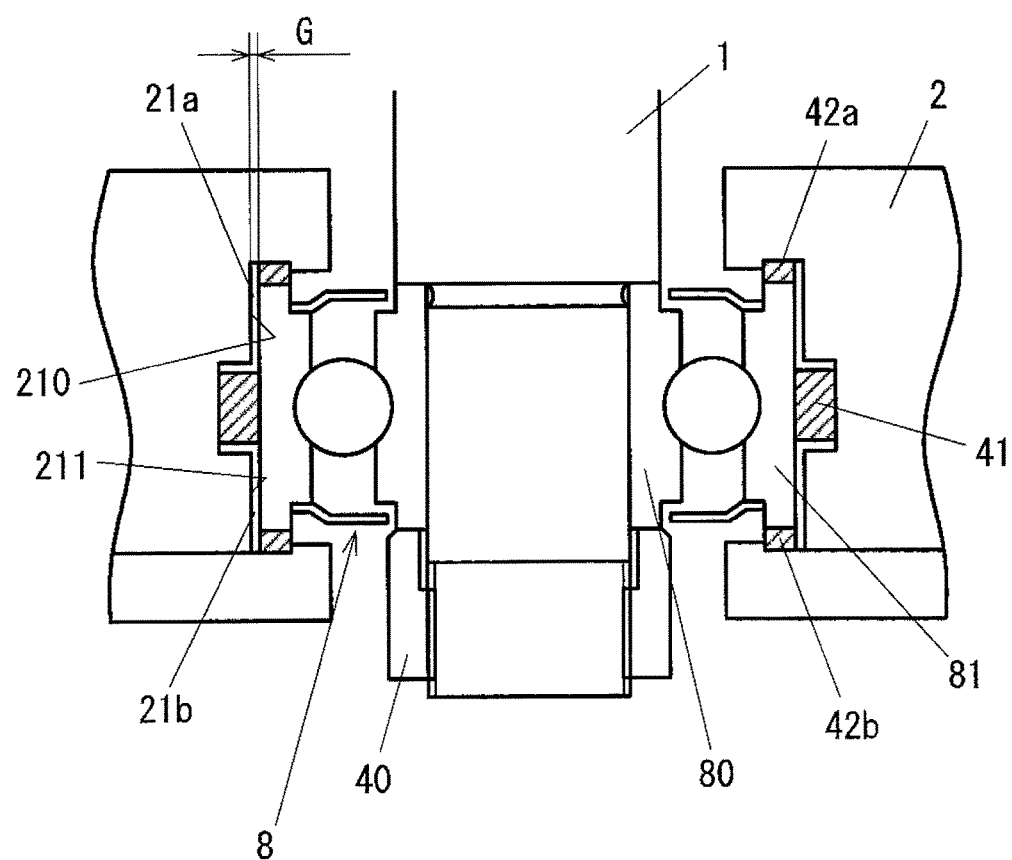
FIG. 3 is a diagram showing a first modification of the embodiment.

FIG. 3 is a diagram showing a first modification of the present embodiment. In the first modification, a dimension of a clearance in the radial direction of each of the clearances 21a and 21b filled with the cooling grease is made smaller than that in the case shown in FIG. 2 to reduce the distance between a base inner peripheral face 210 and the outer peripheral face of the outer ring 81 in the clearance 21a and the distance between a base inner peripheral face 211 and the outer peripheral face of the outer ring 81 in the clearance 21b. In the example shown in FIG. 3, a dimension of a clearance in the radial direction is set to be equal to the dimension G shown in FIG. 2, specifically, approximately 0.1 mm to 0.3 mm. Heat of the outer ring 81 is transmitted to the base 2 via the cooling grease filled in the clearances 21a and 21b. Thus, the heat radiation performance from the outer ring 81 to the base 2 can be improved by arranging the base inner peripheral faces 210 and 211 close to the outer peripheral face of the outer ring 81 as shown in FIG. 3 to reduce the heat transfer distance of the cooling grease.

(Second Modification)

Figure 4:
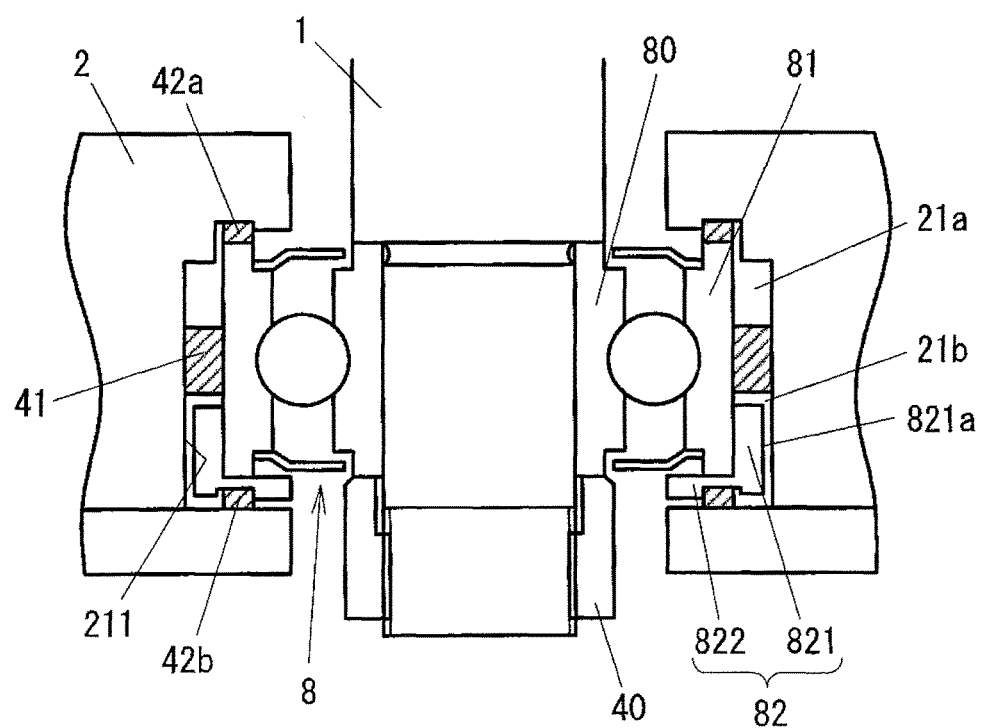
FIG. 4 is a diagram showing a second modification of the embodiment.

FIG. 4 is a diagram showing a second modification of the present embodiment. In the first modification described above, the dimension of the clearance between the outer ring 81 and each of the base inner peripheral faces 210 and 211 is set to be small to improve the heat radiation performance from the outer ring 81 to the base 2. On the other hand, in the second modification shown in FIG. 4, a heat radiation member 82 which is in contact with the outer ring 81 is provided.

The heat radiation member 82 is a ring-like member having an L-shaped cross section. The heat radiation member 82 includes a cylindrical section 821 and a flange section 822 located on the lower end of the cylindrical section 821. A high thermal conductive material having a higher thermal conductivity than the outer ring, for example, a metal material such as an aluminum alloy is used in the heat radiation member 82. Typically, the outer ring 81 is formed of iron and has a thermal conductivity of approximately 83.5 W/(m·K). On the other hand, the thermal conductivity of an aluminum alloy is approximately 236 W/(m·K).

In order to reduce the influence on the rotor whirling, the weight of the heat radiation member 82 is preferably light. The flange section 822 is interposed between the lower end face of the outer ring 81 and the elastic member 42b. The cylindrical section 821 extending from the flange section 822 is arranged in the clearance 21b filled with grease. The radial distance between the cylindrical section 821 and the base inner peripheral face 211 in the clearance 21b is set to be small, for example, to the dimension G described above. An outer peripheral face 821a of the cylindrical section 821 functions as a heat radiation surface. Heat of the outer ring 81 is partially released through the heat radiation member 82. Since the distance between the heat radiation member 82 and the base inner peripheral face 211 is small, the heat radiation performance from the outer ring 81 to the base 2 is improved compared to the embodiment shown in FIG. 2.

As described above, in the present embodiment, the vacuum pump (turbo-molecular pump 100) includes the ball bearing 8 which supports the rotor 3, the base 2 as a holding section which elastically holds the outer ring 81 of the ball bearing 8, and the grease which is filled between the outer ring 81 and the base 2 and has a consistency of NLGI No. 1.5 or less. The cooling grease filled between the outer ring 81 and the base 2 improves the heat radiation performance of the outer ring 81. Further, since a soft grease having a consistency of NLGI No. 1.5 or less is used as the cooling grease, the radial stiffness to the outer ring 81 is reduced. Thus, the vibration transmission from the outer ring 81 to the base 2 can be sufficiently reduced.

Further, the two elastic members 42a and 42b which elastically support the axial end faces of the outer ring 81 and the elastic member 41 which elastically supports the outer ring 81 in the radial direction are disposed on the base 2. The cooling grease is filled in regions (the clearances 21a and 21b) surrounded by the elastic members 41, 42a and 42b, the outer ring 81, and the base 2. The cooling grease is maintained in a grease state at a pump operating temperature (typically, 20° C. to 80° C.). Thus, even when the elastic members 41, 42a and 42b are not elastic members for oil seal, it is possible to prevent the grease from flowing out through the clearances 21a and 21b. The oil separation degree of the cooling grease is preferably 10% or less at the pump operating temperature.

As shown in FIG. 4, when the vacuum pump is provided with the heat radiation member 82 which includes the flange section 822 which is in contact with the outer ring 81 and the cylindrical section 821 (heat radiation section) which is arranged in the clearance 21b, the heat radiation member 82 having a higher thermal conductivity than the outer ring 81, it is possible to further improve the heat radiation performance from the outer ring 81 to the base 2.

The above embodiment and the modifications may be used independently or in combination so that the effects of the embodiment and the modifications can be achieved independently or in a synergetic manner. Further, the present invention is not limited at all to the above embodiment unless the features of the present invention are impaired. For example, although the elastic members 42a and 42b are respectively disposed on the upper end face and the lower end face of the outer ring 81, only either the elastic member 42a or the elastic member 42b may be provided.

What is claimed is:

1. A vacuum pump comprising:
   a ball bearing which supports a rotor;
   a holding section which elastically holds an outer ring of the ball bearing; and
   a cooling grease which is filled between the outer ring and the holding section, the cooling grease having a consistency of NLGI No. 1.5 or less.

2. The vacuum pump according to claim 1, wherein
   the holding section includes at least two elastic members which elastically support the outer ring, and
   the cooling grease is filled in a region surrounded by the at least two elastic members, the outer ring and the holding section.

3. The vacuum pump according to claim 2, wherein
   the cooling grease is maintained in a grease state at a pump operating temperature so as to be prevented from flowing out of the region surrounded by the at least two elastic members, the outer ring and the holding section.

4. The vacuum pump according to claim 2, wherein
   a dimension of a clearance in the radial direction of the region filled with the cooling grease is set to be 0.1 mm to 0.3 mm.

5. The vacuum pump according to claim 2, further comprising a heat radiation member including a contact section being in contact with the outer ring and a heat radiation section extending from the contact section and disposed in the region filled with the cooling grease, the heat radiation member having a higher thermal conductivity than the outer ring.

6. The vacuum pump according to claim 1, wherein the cooling grease has an oil separation degree of 10% or less at a pump operating temperature.

7. The vacuum pump according to claim 1, wherein the cooling grease is a fluorine grease having a saturated vapor pressure of $10^{-8}$ Pa or less at a temperature of 20° C.

8. The vacuum pump according to claim 1, wherein the thermal conductivity of the cooling grease is 0.15 to 0.4 W/mK.

9. The vacuum pump according to claim 1, wherein
the holding section includes a first ring-shaped elastic member disposed on the upper end face of the outer ring, a second ring-shaped elastic member disposed on the lower end face of the outer ring, and a third ring-shaped elastic member disposed on the outer peripheral side of the outer ring, and
the cooling grease is filled in a region surrounded by the elastic members, the outer ring and the holding section.

10. A vacuum pump comprising:
a ball bearing which supports a rotor;
a holding section which elastically holds an outer ring of the ball bearing; and
a grease which is filled between the outer ring and the holding section, the grease having a consistency of NLGI No. 1.5 or less, wherein
the holding section includes at least two elastic members which elastically support the outer ring,
the grease is filled in a region surrounded by the at least two elastic members, the outer ring and the holding section, and
the grease has an oil separation degree of 10% or less at a pump operating temperature.

\* \* \* \* \*